US012582969B2

(12) United States Patent
Xiong et al.

(10) Patent No.: US 12,582,969 B2
(45) Date of Patent: Mar. 24, 2026

(54) SUPPORTED COMPOSITE OXIDE CATALYST AND PREPARATION AND USE THEREOF

(71) Applicant: Shanghai Huayi New Material Co., Ltd, Shanghai (CN)

(72) Inventors: Desheng Xiong, Shanghai (CN); Hualong Xu, Shanghai (CN); Yan Zhuang, Shanghai (CN); Wei Shen, Shanghai (CN); Yibin Wang, Shanghai (CN); Yao Cui, Shanghai (CN); Xiaodong Chu, Shanghai (CN)

(73) Assignee: Shanghai Huayi New Material Co., Ltd, Shanghai (CN)

( * ) Notice: Subject to any disclaimer, the term of this patent is extended or adjusted under 35 U.S.C. 154(b) by 505 days.

(21) Appl. No.: 18/270,339

(22) PCT Filed: Nov. 2, 2021

(86) PCT No.: PCT/CN2021/128085
§ 371 (c)(1),
(2) Date: Jun. 29, 2023

(87) PCT Pub. No.: WO2022/142709
PCT Pub. Date: Jul. 7, 2022

(65) Prior Publication Data
US 2024/0058796 A1 Feb. 22, 2024

(30) Foreign Application Priority Data

Dec. 29, 2020 (CN) .......................... 202011587101.5

(51) Int. Cl.
| | |
|---|---|
| *B01J 21/08* | (2006.01) |
| *B01J 6/00* | (2006.01) |
| *B01J 23/881* | (2006.01) |
| *B01J 23/887* | (2006.01) |
| *B01J 35/64* | (2024.01) |
| *B01J 37/08* | (2006.01) |
| *C07C 45/38* | (2006.01) |

(52) U.S. Cl.
CPC ........... *B01J 23/8872* (2013.01); *B01J 6/001* (2013.01); *B01J 35/647* (2024.01); *B01J 37/08* (2013.01)

(58) Field of Classification Search
CPC ...... B01J 23/8872; B01J 6/001; B01J 35/647; B01J 37/08; B01J 21/08; B01J 23/881; B01J 35/615; B01J 37/031; B01J 23/002; B01J 35/617; C07C 45/38
USPC .................................................. 502/300, 314
See application file for complete search history.

(56) References Cited

U.S. PATENT DOCUMENTS

| | | | |
|---|---|---|---|
| 4,181,629 A | 1/1980 | Cairati et al. | |
| 5,118,868 A | 6/1992 | Sarup et al. | |
| 6,881,702 B2 * | 4/2005 | Arnold ..................... | B01J 23/88 |
| | | | 502/212 |
| 7,803,972 B2 | 9/2010 | Gückel et al. | |
| 2011/0077148 A1 * | 3/2011 | Kano ................... | B01J 37/0009 |
| | | | 502/311 |
| 2011/0105789 A1 * | 5/2011 | Miyatake ................. | B01J 37/04 |
| | | | 562/532 |
| 2014/0024861 A1 | 1/2014 | Okumura et al. | |
| 2018/0221854 A1 * | 8/2018 | Bonduelle .............. | B01J 23/881 |
| 2019/0351400 A1 * | 11/2019 | Haider ................... | C10G 2/332 |

FOREIGN PATENT DOCUMENTS

| | | |
|---|---|---|
| CN | 1100667 A | 3/1995 |
| CN | 1473654 A | 2/2004 |
| CN | 1546232 A | 11/2004 |
| CN | 103648641 A | 3/2014 |
| CN | 106693981 A | 5/2017 |
| CN | 108114744 A | 6/2018 |
| CN | 112827496 A | 5/2021 |
| EP | 1792651 A1 | 6/2007 |
| WO | 2010034480 A2 | 4/2010 |

OTHER PUBLICATIONS

European Patent Office, Extended European Search Report, Application No. 21913453.3, Nov. 26, 2024, 4 pages.
PCT International Search Report and Written Opinion, PCT/CN2021/128085, Jan. 29, 2022, 13 pages.
The State Intellectual Property Office of People's Republic of China, First Office Action and Search Report, Application No. 202011587101.5, Jan. 11, 2022, 8 pages.
The State Intellectual Property Office of People's Republic of China, Supplementary Search, Application No. 202011587101.5, Mar. 9, 2022, 1 page.

* cited by examiner

*Primary Examiner* — Cam N. Nguyen
(74) *Attorney, Agent, or Firm* — Quarles & Brady LLP

(57) ABSTRACT

In a supported composite oxide catalyst and preparation and use thereof, the catalyst has the general formula: $FeMo_aSi_bX_cO_d$, wherein X is a modified metal and is selected from alkali metals or alkaline earth metals; a=0.5-5, b=10-50, c=0.001-0.1, and d is the amount of oxygen element satisfying the chemical valence. The catalyst is prepared with the following method: (i) providing an acidic aqueous solution of a surfactant; (ii) dissolving an iron-containing compound and a complexing agent in the acidic aqueous solution, adding tetra $C_{1-4}$ alkyl orthosilicate, and performing hydrolysis, crystallization and calcination to obtain a precursor; and (iii) forming a mixed liquid of the precursor, a molybdenum-containing compound and a modifying metal compound, drying same and calcinating the resultant, so as to obtain the supported composite oxide catalyst.

16 Claims, No Drawings

SUPPORTED COMPOSITE OXIDE CATALYST AND PREPARATION AND USE THEREOF

CROSS-REFERENCE TO RELATED APPLICATION

This application represents the U.S. national stage entry of International Application No. PCT/CN2021/128085 filed Nov. 2, 2021, which claims priority to Chinese Application No. 202011587101.5 filed Dec. 29, 2020, the disclosure of which is incorporated herein by reference in its entirety and for all purposes.

TECHNICAL FIELD

The present invention relates to a supported composite oxide catalyst. The catalyst prepared by the method of the present invention has improved low-temperature performance and lifetime. The present invention also relates to a method for preparing the above catalyst and its use in selective oxidation of methanol to formaldehyde.

BACKGROUND ART

Formaldehyde is an important basic raw material in the organic chemical industry. Formaldehyde is mainly produced by selective catalytic oxidation of methanol. According to the catalysts used, the processes are classified into the "silver process" and the "iron molybdenum process". The catalysts are electrolytic silver catalysts and iron molybdate-oxide composite catalysts. The "silver process" employs an electrolytic silver catalyst which is generally a silver screen or a thin layer of silver particles. This process is simple with low investment. An excessive amount of methanol is used during the reaction, and the reaction temperature is about 600-720° C. However, the process has such problems as low methanol conversion, low formaldehyde selectivity, and short silver catalyst life. Compared with the "silver process", the "iron molybdenum process" employs a fixed-bed technology, wherein the apparatus used has a larger production capacity. The methanol conversion is high; the reaction temperature is low; and the unit consumption of methanol is small. Moreover, high-concentration formaldehyde and the like can be produced. Therefore, nowadays, most of the newly-built plants for production of formaldehyde by methanol oxidation adopt the iron-molybdenum process.

The iron molybdenum catalyst used currently is mainly composed of two crystalline phases of iron molybdate and molybdenum trioxide. As the preparation method is concerned, the catalyst is generally prepared by a co-precipitation process. During preparation, an iron salt solution and a molybdenum salt solution are mixed, and after precipitation, the precipitate is subjected to filtration, washing, calcinations and other steps to obtain the final catalyst.

CN1546232 reports a method for preparing an iron-molybdenum catalyst for oxidation of methanol to formaldehyde, wherein a ferric nitrate solution is added dropwise as a precipitant to an ammonium molybdate solution under strong stirring. Although the catalyst thus prepared provides higher methanol conversion and formaldehyde yield, the catalyst obtained by this preparation method is a random mixture of iron molybdate and molybdenum trioxide. Thus, segregation of $Fe_2O_3$ is easy to occur, which will affect the yield of formaldehyde and the stability of the catalyst.

CN1100667 reports a four-component catalyst of iron, molybdenum, cobalt and chromium, wherein the calcination temperature of the catalyst is 400° C., and the temperature of the methanol oxidation reaction is 340-380° C.

CN106693981 reports a catalyst consisting of molybdenum, iron, vanadium, a promoter metal and a binder metal, wherein the promoter metal is one of nickel, aluminum, lanthanum, cerium, bismuth or manganese, and the binder metal is one of titanium or zirconium. The catalyst exhibits good activity at 280-300° C.

CN108114744A discloses a method for preparing a supported iron-molybdenum-based catalyst, comprising: mixing ethyl orthosilicate and tetraalkylammonium hydroxide, and hydrolyzing them at 30-90° C. to obtain solution A; mixing tetrabutyl titanate and tetraalkylammonium hydroxide in a molar ratio, and hydrolyzing them at 30-90° C. to obtain solution B; adding solution B to solution A; then adding a soluble iron salt and a soluble molybdenum salt dropwise to the above mixed solution, followed by crystallization, separation, drying, and calcinations to obtain a supported iron-molybdenum-based catalyst ($MoO_3$—$Fe_2$ $(MoO_4)_3$/TS-1). When the catalyst is used under ambient pressure at a reaction temperature of 250-400° C. with the volume content of methanol at the inlet being 0.5-15% and the space velocity of the carrier gas being 5000-25000 h$^{-1}$, the methanol conversion can be 95-99%, and the yield of formaldehyde can be 94-98%.

Although a desired methanol conversion can be achieved with each of the above-mentioned catalysts, the active specific surface areas of the catalysts are small, and the exposed active sites of the catalysts are few. As a result, a high reaction temperature is needed. Thus, the formaldehyde selectivity is not high enough, and there are a good number of by-products. In addition, molybdenum is easy to sublime and run off at a high reaction temperature, which speeds up deactivation of the catalyst. As the activity of the catalyst cannot be maintained sufficiently, the service life of the catalyst is shortened.

Therefore, there is still a need to develop a supported composite oxide catalyst to catalyze selective oxidation of methanol to formaldehyde. It is required that this catalyst has good low-temperature performance and thus a prolonged service life.

There is also a need to develop a method for preparing this catalyst.

SUMMARY

One object of the present invention is to provide a supported composite oxide catalyst for catalyzing selective oxidation of methanol to formaldehyde. This catalyst has good low-temperature performance and thus a prolonged service life.

Another object of the present invention is to provide a method for preparing the catalyst.

Therefore, one aspect of the present invention is directed to a supported composite oxide catalyst having the following general formula:

$$FeMo_aSi_bX_cO_d$$

wherein X is a modifying metal selected from alkali metals or alkaline earth metals;

a=0.5-5, b=10-50, c=0.001-0.1, d represents an amount of oxygen element balancing chemical valence;

wherein the catalyst is prepared according to the following method:

(i) providing an acidic aqueous solution of a surfactant;

(ii) dissolving an iron-containing compound and a complexing agent in the acidic aqueous solution, adding tetra-$C_{1-4}$ alkyl orthosilicate, followed by hydrolysis, crystallization and calcination to obtain a precursor;

(iii) formulating the precursor, a molybdenum-containing compound and a modifying metal compound into a mixed solution, followed by drying and calcination to obtain a supported composite oxide catalyst.

Another aspect of the present invention is directed to a method for preparing a supported composite oxide catalyst, wherein the catalyst has the following general formula:

$$FeMo_aSi_bX_cO_d$$

wherein X is a modifying metal selected from alkali metals or alkaline earth metals;

a=0.5-5, b=10-50, c=0.001-0.1, d represents an amount of oxygen element balancing chemical valence;

wherein the method comprises:

(i) providing an acidic aqueous solution of a surfactant;

(ii) dissolving an iron-containing compound and a complexing agent in the acidic aqueous solution, adding tetra-$C_{1-4}$ alkyl orthosilicate, followed by hydrolysis, crystallization and calcination to obtain a precursor;

(iii) formulating the precursor, a molybdenum-containing compound and a modifying metal compound into a mixed solution, followed by drying and calcination to obtain a supported composite oxide catalyst.

Still another aspect of the present invention is directed to use of the catalyst for catalyzing selective oxidation of methanol to formaldehyde.

DETAILED DESCRIPTION

The supported composite oxide catalyst of the present invention has the following general formula:

$$FeMo_aSi_bX_cO_d$$

wherein X is a modifying metal selected from alkali metals or alkaline earth metals. In an embodiment of the present invention, the modifying metal is selected from potassium, sodium or a mixture thereof.

In the catalyst of the present invention, the molybdenum content a=0.5-5, preferably 0.8-4.6, more preferably 1.2-4.2, still more preferably 1.5-3.8, yet more preferably 1.8-3.5, most preferably 2.1-3.1.

The silicon content b=10-50, preferably 13-46, more preferably 16-42, still more preferably 20-40, most preferably 25-35.

The modifying metal content c=0.001-0.1, preferably 0.005-0.096, more preferably 0.008-0.092, still more preferably 0.012-0.088, yet more preferably 0.016-0.084, most preferably 0.02-0.08.

d represents an amount of oxygen element balancing chemical valence.

In an embodiment of the present invention, the supported composite oxide catalyst is selected from $FeMo_4Si_{20}K_{0.01}O_d$, $FeMo_{2.5}Si_{40}K_{0.01}O_d$, $FeMo_4Si_{20}Na_{0.01}O_d$, $FeMo_4Si_{20}K_{0.01}O_d$ or a mixture thereof.

A molecular sieve of the catalyst of the present invention has a pore diameter of about 6-10 nm, preferably 7-10 nm, more preferably 8-9 nm.

The catalyst of the present invention has a specific surface area of 350-580 m²/g, preferably 370-570 m²/g, more preferably 390-560 m²/g, most preferably 400-550 m²/g as measured by nitrogen adsorption/desorption.

The method for preparing the catalyst of the present invention comprises the following steps:

(i) An acidic aqueous solution of a surfactant is provided.

The surfactant suitable for the method of the present invention is selected from polyoxyethylene ether-polyoxypropylene ether-polyoxyethylene ether, poly(1,2-ethylene glycol)-polypropylene glycol-poly(1,2-ethylene glycol), polyethylene oxide-polypropylene oxide-polyethylene oxide triblock copolymers or a combination of two or more thereof, preferably polyethylene oxide-polypropylene oxide-polyethylene oxide triblock copolymer (P123).

In the acidic aqueous solution of the surfactant, a mass ratio of hydrogen ions to the surfactant is about 0.05-0.15:1, preferably 0.06-0.14:1, more preferably 0.07-0.13:1, still more preferably 0.08-0.12:1, most preferably 0.09-0.11:1.

In an embodiment of the present invention, the method for providing the acidic aqueous solution of the surfactant according to the present invention comprises: dissolving the surfactant in water, and adding concentrated hydrochloric acid with a concentration of about 37% after the surfactant is completely dissolved, wherein a weight ratio of the concentrated hydrochloric acid to the surfactant is 5-15:1.

In an embodiment of the present invention, the surfactant is dissolved in water of 30-60° C., and a weight ratio of water to the surfactant is 10-40:1. The concentrated hydrochloric acid is added after the surfactant is completely dissolved, and a weight ratio of the concentrated hydrochloric acid to the surfactant is 5-15:1.

(ii) An iron-containing compound and a complexing agent are dissolved in the acidic aqueous solution, and tetra-$C_{1-4}$ alkyl orthosilicate is added, followed by hydrolysis, crystallization and calcination to obtain a precursor.

The method of the present invention includes, for example, a step of adding the iron-containing compound and the complexing agent to the acidic aqueous solution to dissolve them.

The iron-containing compound suitable for the method of the present invention is not particularly limited, and may be a conventional iron-containing compound known in the art. In an embodiment of the present invention, the iron-containing compound includes an iron salt, such as a water-soluble iron salt.

In an embodiment of the present invention, the iron-containing compound is selected from ferric nitrate, ferrous nitrate, ferric sulfate, ferrous sulfate, ferric chloride, ferrous chloride, or a combination thereof.

The complexing agent suitable for the method of the present invention is not particularly limited, as long as it can form a complex with iron ions and does not affect the catalytic performance of the catalyst of the present invention.

In an embodiment of the present invention, the complexing agent is one that is capable of forming a complex with iron ions.

In an embodiment of the present invention, the complexing agent is selected from citric acid and/or tartaric acid.

In an embodiment of the present invention, a molar ratio of the complexing agent to the iron-containing compound is 0.2-3:1, preferably 0.5-2.6:1, more preferably 0.8-2.2:1, still more preferably 1.2-2.0:1, yet more preferably 1.4-1.8:1, most preferably 1.5-1.6:1.

The method of the present invention comprises a step of adding tetra-$C_{1-4}$ alkyl orthosilicate to the solution of the complexing agent and the iron compound formulated above to allow for hydrolysis.

The tetra-$C_{1-4}$ alkyl orthosilicate suitable for the method of the present invention is not particularly limited, and may be a conventional $C_{1-4}$ alkyl orthosilicate known in the art. In an embodiment of the present invention, the $C_{1-4}$ alkyl orthosilicate includes tetramethyl orthosilicate, tetraethyl orthosilicate, tetrapropyl orthosilicate, tetrabutyl orthosilicate, methyl triethyl orthosilicate, dimethyl diethyl orthosilicate or a mixture of two or more thereof, preferably tetraethyl orthosilicate.

The orthosilicate may be added under stirring. For example, the orthosilicate may be added slowly to the solution of the complexing agent and the iron-containing compound formulated above while stirring.

The hydrolysis process performed after adding the orthosilicate is not particularly limited, and may be a conventional hydrolysis process known in the art. In an embodiment of the present invention, the formulated reactant is hydrolyzed at 30-90° C., preferably 40-80° C., more preferably 50-70° C. for 0.5-10 hours, preferably 1-9 hours, more preferably 2-8 hours, still more preferably 3-7 hours, most preferably 4-6 hours.

The method of the present invention comprises a step of crystallizing the resultant hydrolyzate. The applicable crystallization method is not particularly limited, and may be a conventional crystallization method known in the art. In an embodiment of the present invention, the resultant hydrolyzate is transferred to a crystallization kettle (for example, a crystallization kettle with a polytetrafluoroethylene liner) and crystallized at 90-150° C., preferably 95-145° C., more preferably 100-140° C. for 6-72 hours, preferably 10-68 hours, more preferably 15-65 hours, still more preferably 20-60 hours, most preferably 25-55 hours.

After the crystallization is completed, the method of the present invention may further comprise isolating the resultant crystals. The applicable separation process is not particularly limited, and may be a conventional separation process known in the art. In an embodiment of the present disclosure, the separation process includes separation by suction filtration.

After separation, the method of the present invention may further comprise steps of washing and drying the separated crystals. The applicable washing and drying processes are not particularly limited, and may be conventional washing and drying processes known in the art.

The method of the present invention comprises a step of calcining the washed and dried crystals. The applicable calcination process is not particularly limited, and may be a conventional calcination process known in the art. In an embodiment of the present invention, the washed and dried crystals are calcined at 350-550° C., preferably 380-520° C., more preferably 400-500° C. for 3-12 hours, preferably 4-10 hours, more preferably 5-8 hours to prepare a catalyst precursor.

(iii) The precursor, a molybdenum-containing compound and a modifying metal compound are formulated into a mixed solution, followed by drying and calcination to obtain a supported composite oxide catalyst.

The molybdenum-containing compound suitable for the method of the present invention is not particularly limited, and may be a conventional molybdenum-containing compound known in the art. In an embodiment of the present invention, the molybdenum-containing compound is selected from ammonium metamolybdate, ammonium molybdate, sodium molybdate, lithium molybdate, potassium molybdate or a combination of two or more thereof, preferably ammonium metamolybdate.

The modifying metal compound suitable for the method of the present invention includes alkali metal or alkaline earth metal compounds. In an embodiment of the present invention, the modifying metal compound is selected from potassium nitrate, sodium nitrate or a mixture thereof.

In an embodiment of the present invention, sodium molybdate, lithium molybdate and/or potassium molybdate are/is used as both a molybdenum-containing compound and a modifying metal compound.

In an embodiment of the present invention, the method of the present invention comprises dissolving the molybdenum-containing compound and the modifying metal compound in pure water to obtain a mixed solution, wherein a total concentration of the two metal salts in the solution is 0.5-5M, preferably 0.8-4.5M, more preferably 1.2-4M, still more preferably 1.5-3.5M, most preferably 1.8-3M. Then, the precursor obtained in the preceding step is dispersed in the mixed solution, followed by drying.

The applicable drying process is not particularly limited, and may be a conventional drying process known in the art. An impregnated solid is obtained after drying.

The method of the present invention further comprises a step of calcining the impregnated solid obtained above. The applicable calcination process is not particularly limited, and may be a conventional calcination process known in the art. In an embodiment of the present invention, the calcination comprises calcining the dried impregnated solid at 300-600° C., preferably 350-550° C., more preferably 400-500° C. for 1-24 hours, preferably 3-22 hours, more preferably 5-20 hours, still more preferably 8-16 hours, most preferably 10-13 hours to obtain a supported composite oxide catalyst.

In a preferred embodiment of the present invention, the method for preparing the supported composite oxide catalyst of the present invention comprises the following steps:

(1) Dissolving a surfactant in warm water; adding concentrated hydrochloric acid after the surfactant is completely dissolved; then adding ferric nitrate and citric acid; adding tetra-$C_{1-4}$ alkyl orthosilicate slowly under stirring after ferric nitrate and citric acid are completely dissolved; after addition of tetra-$C_{1-4}$ alkyl orthosilicate is completed, hydrolyzing it;

(2) after the hydrolysis is completed, transferring the solution to a crystallization kettle to allow for crystallization;

(3) after the crystallization is completed, performing separation by suction filtration, drying, and then calcination to obtain a precursor;

(4) dissolving hexaammonium molybdate and potassium nitrate in water, then dispersing the precursor obtained in the preceding step in the mixed solution under stirring, followed by drying;

(5) after drying, calcining the solid to obtain a supported composite oxide catalyst.

In the preparation of the supported composite oxide catalyst of the present invention, an iron-containing compound and a complexing agent are introduced synchronously during preparation of a mesoporous molecular sieve, and then obtaining a precursor after hydrothermal reaction and calcination. Then a molybdenum-containing compound and a modifying metal precursor are loaded onto the precursor by means of wet impregnation, followed by drying and calcination to obtain the catalyst. Compared with the method in which an iron-containing compound and a molybdenum-containing compound are introduced simultaneously during preparation of a mesoporous molecular sieve, the catalyst prepared by the method of the present invention shows further improved low-temperature performance and catalyst life.

The active components of the catalyst of the present invention are distributed uniformly in the pores of the mesoporous silica. The catalyst has the advantages of large active specific surface area, high catalyst activity and stable catalyst performance, and less loss of the molybdenum component after long-term operation.

The catalyst of the present invention is suitable for catalyzing the oxidation reaction of methanol to formaldehyde. In an embodiment of the present invention, high methanol conversion and high formaldehyde yield can be achieved under the following conditions: ambient pressure; a reaction temperature of 220-260° C., preferably 225-255° C., more preferably 230-250° C.; an inlet methanol content of 8-12 vol %, preferably 9-11 vol %, more preferably 9.5-10.5 vol %; an inlet oxygen content of 8-12 vol %; and a reaction gas space velocity of 10000-30000 h⁻¹.

The present invention will be further illustrated with reference to the following Examples.

Example 1

A catalyst was prepared according to the following steps:

(1) 4.17 grams of surfactant P123 was dissolved in 125 grams of water at 40° C.; 25 grams of concentrated hydrochloric acid was added after the surfactant was completely dissolved; then, 4.04 grams of ferric nitrate and 1.92 grams of citric acid were added; 41.67 grams of tetraethyl orthosilicate was added slowly under stirring after ferric nitrate and citric acid were completely dissolved; hydrolysis was performed at 60° C. for 2 hours after the addition of tetraethyl orthosilicate was completed;

(2) then, the solution obtained after the hydrolysis was completed was transferred to a crystallization kettle lined with polytetrafluoroethylene to allow for crystallization at 110° C. for 24 hours;

(3) after the crystallization was completed, separation by suction filtration and drying were performed, followed by calcination at 500° C. for 6 hours to obtain a precursor;

(4) 7.06 grams of hexaammonium molybdate and 0.0101 grams of potassium nitrate were dissolved in 40 ml of pure water; then, the precursor obtained in the preceding step was dispersed in the mixed solution; after dispersing under stirring for 4 hours, drying was performed at 110° C. for 6 hours;

(5) after drying, the solid was calcined at 450° C. for 5 hours to obtain a supported composite oxide catalyst.

The molar ratio of the catalyst components Fe:Mo:Si:K was 1:4:20:0.01. The specific surface area of the catalyst measured by nitrogen adsorption/desorption was 352 m²/g.

Evaluation on catalyst activity:

The oxidation reaction of methanol was conducted in a fixed-bed reaction apparatus, and the catalyst was fixed in a stainless steel reaction tube with an inner diameter of 10 mm. Before the test, the catalyst obtained by calcinations was ground and sieved to obtain 40-60 mesh particles, and then fixed in the reaction tube.

Methanol was metered using a duplex plunger pump, and air and nitrogen were metered using mass flow meters. After the methanol liquid was vaporized with a vaporizer, it was mixed with nitrogen and air, and then entered the catalyst bed for reaction. The reaction gas contained 11 mol % methanol, 10 mol % oxygen, and a balance of nitrogen. The space velocity of the reaction gas was 25000 h⁻¹. After feeding the reaction gas for 2 hours, a gas sample was taken and analyzed with gas chromatography to determine the contents of methanol, dimethyl ether, CO and CO₂. The conversion of methanol and the selectivity of dimethyl ether, CO and CO₂ were calculated from the test results of gas chromatography.

Calculations were performed according to the following equations:

Methanol conversion: $C_{methanol}$=(amount of charged methanol−amount of discharged methanol)/ amount of charged methanol Dimethyl ether selectivity: $S_{dimethyl\ ether}$=2×amount of discharged dimethyl ether/(amount of charged methanol×methanol conversion)

CO selectivity: $S_{CO}$=amount of discharged CO/ (amount of charged methanol×methanol conversion)

CO₂ selectivity: $S_{CO2}$=amount of discharged CO₂/ (amount of charged methanol×methanol conversion)

Formaldehyde selectivity: $S_{formaldehyde}$=1− $S_{dimethyl\ ether}$−$S_{CO}$−$S_{CO2}$ The temperature of the reactor was adjusted, and the compositions of the reaction gas at reaction temperatures between 200° C. and 250° C. were measured respectively, and then the methanol conversion and formaldehyde selectivity at different reaction temperatures were calculated according to the above calculation formulas. The experimental results are as follows:

| | Reaction Temperature, ° C. | | | | | |
| | 200 | 210 | 220 | 230 | 240 | 250 |
|---|---|---|---|---|---|---|
| Methanol Conversion | 64.2% | 90.1% | 98.5% | 99.3% | 99.7% | 99.8% |
| Formaldehyde Selectivity | 96.2% | 96.5% | 95.9% | 95.5% | 94.9% | 94.8% |

Comparative Example 1

A conventional method was used to prepare a comparative catalyst having a Mo:Fe molar ratio of 2.5:1. The process for preparing this catalyst is as follows:

88.28 grams of hexaammonium molybdate was dissolved in 500 grams of pure water to formulate solution A. 80.80 grams of ferric nitrate nonahydrate was dissolved in 400 grams of water to obtain solution B. Solution B was added dropwise to solution A slowly at 60° C. for 30 minutes under stirring. After the dropwise addition of solution B was completed, the resulting slurry was continued to be stirred at 80° C. for 2 hours for aging, and then dried at 150° C. for 12 hours. The dried material was pulverized to less than 200 mesh. Then, 2 grams of graphite and 10 grams of pure water were added and mixed uniformly, and then tableted. The tableted sample was calcined at 450° C. for 6 h to obtain a catalyst. The molar ratio of the catalyst components Mo:Fe was 2.5:1.0. The specific surface area of the catalyst measured by nitrogen adsorption/desorption was 4.5 m²/g.

The activity of the catalyst was tested at different reaction temperatures according to the same process in Example 1. The reaction gas contained 11 mol % methanol, 10 mol % oxygen, and a balance of nitrogen. The space velocity of the reaction gas was 25000 h⁻¹.

| | Reaction Temperature, ° C. | | | | | |
|---|---|---|---|---|---|---|
| | 200 | 220 | 240 | 260 | 280 | 300 |
| Methanol Conversion | 12.8% | 28.8% | 56.7% | 75.9% | 89.5% | 98.0% |
| Formaldehyde Selectivity | 96.8% | 97.0% | 97.2% | 96.2% | 95.5% | 93.8% |

As it can be seen from the experimental results of Example 1 and Comparative Example 1, the activity of the supported composite oxide catalyst of the present invention is significantly higher under the conditions of high space velocity and low reaction temperature.

Example 2

A catalyst was prepared according to the same method in Example 1, and then the stability of catalyst was tested under the following process conditions:

The reaction gas contained 11 mol % methanol, 10 mol % oxygen, and a balance of nitrogen. The space velocity of the reaction gas was 25000 h$^{-1}$, and the reaction temperature was 230° C.

The catalyst was operated continuously for 240 hours, and the initial activity of the catalyst was compared with the activity after long-term operation. The results are as follows:

| | Reaction Temperature, ° C. | |
|---|---|---|
| | Initial Activity | After 240 hours |
| Methanol Conversion | 99.3% | 98.8% |
| Formaldehyde Selectivity | 95.5% | 95.6% |

After the catalyst was operated continuously for 240 hours, the reaction was stopped. The catalyst was taken out, and the elemental composition of the catalyst was analyzed with an inductively coupled plasma-atomic emission spectrometer (ICP-AES). During long-term reaction, molybdenum tends to sublime, whereas there is substantially no loss of iron element. The sublimation of molybdenum element is the main cause for deactivation of an iron molybdate catalyst. After long-term operation, the Fe:Mo ratio of the catalyst of the present invention changed from 1:4.00 to 1:3.92, with only 2% loss of molybdenum. The activity of the catalyst was also relatively stable. The mesoporous silica support can stabilize molybdenum element, retard the loss of molybdenum, and thus improve the stability of the catalyst.

Comparative Example 2

A catalyst was prepared according to the same method in Comparative Example 1, and then the stability of catalyst was tested under the following process conditions:

The reaction gas contained 11 mol % methanol, 10 mol % oxygen, and a balance of nitrogen. The space velocity of the reaction gas was 25000 h$^{-1}$, and the reaction temperature was 300° C.

The catalyst was operated continuously for 240 hours, and the initial activity of the catalyst was compared with the activity after long-term operation. The results are as follows:

| | Reaction Temperature, ° C. | |
|---|---|---|
| | Initial Activity | After 240 hours |
| Methanol Conversion | 98.0% | 81.2% |
| Formaldehyde Selectivity | 93.8% | 95.2% |

After continuous operation for 240 hours, the catalyst was taken out, and the elemental composition of the catalyst was analyzed with an inductively coupled plasma-atomic emission spectrometer (ICP-AES). It was found that the Fe:Mo ratio changed from 1:2.50 to 1:1.92, with 23.2% loss of molybdenum, indicating that the activity of the catalyst decreased greatly.

Example 3

The method for preparing the catalyst is similar to that in Example 1. Particularly, the catalyst was prepared according to the following steps:

(1) 8.33 grams of surfactant P123 was dissolved in 250 grams of water at 40° C.; 83.33 grams of concentrated hydrochloric acid was added after the surfactant was completely dissolved; then, 2.02 grams of ferric nitrate and 0.96 grams of citric acid were added; 41.67 grams of tetraethyl orthosilicate was added slowly under stirring after ferric nitrate and citric acid were completely dissolved; hydrolysis was performed at 60° C. for 2 hours after the addition of tetraethyl orthosilicate was completed;

(2) then, the solution obtained after the hydrolysis was completed was transferred to a crystallization kettle lined with polytetrafluoroethylene to allow for crystallization at 100° C. for 24 hours;

(3) after the crystallization was completed, separation by suction filtration and drying were performed, followed by calcination at 450° C. for 3 hours to obtain a precursor;

(4) 2.21 grams of hexaammonium molybdate and 0.00506 grams of potassium nitrate were dissolved in 40 ml of pure water; then, the precursor obtained in the preceding step was dispersed in the mixed solution; after dispersing under stirring for 4 hours, drying was performed at 110° C. for 6 hours;

(5) after drying, the solid was calcined at 450° C. for 5 hours to obtain a supported composite oxide catalyst.

The molar ratio of the catalyst components Fe:Mo:Si:K was 1:2.5:40:0.01. The specific surface area of the catalyst measured by nitrogen adsorption/desorption was 525 m$^2$/g.

The activity of the catalyst was tested in the same manner as in Example 1. The test results are as follows:

| | Reaction Temperature, ° C. | | | | | |
|---|---|---|---|---|---|---|
| | 200 | 210 | 220 | 230 | 240 | 250 |
| Methanol Conversion | 32.3% | 56.1% | 81.1% | 92.5% | 98.5% | 99.0% |
| Formaldehyde Selectivity | 96.2% | 96.5% | 96.8% | 96.6% | 95.9% | 95.8% |

After continuous operation at 240° C. for 100 hours, the methanol conversion dropped to 98.1%, and according to the ICP test results, the loss of molybdenum was 1.1%.

Example 4

The method for preparing the catalyst is similar to that in Example 1, except that the complexing agent was changed from citric acid into tartaric acid. Particularly, the catalyst was prepared according to the following steps:

(1) 8.33 grams of surfactant P123 was dissolved in 250 grams of water at 40° C.; 83.33 grams of concentrated hydrochloric acid was added after the surfactant was completely dissolved; then, 2.02 grams of ferric nitrate and 0.75 grams of tartaric acid were added; 41.67 grams of tetraethyl orthosilicate was added slowly under stirring after ferric nitrate and tartaric acid were completely dissolved; hydrolysis was performed at 60° C. for 2 hours after the addition of tetraethyl orthosilicate was completed;

(2) then, the solution obtained after the hydrolysis was completed was transferred to a crystallization kettle lined with polytetrafluoroethylene to allow for crystallization at 100° C. for 24 hours;

(3) after the crystallization was completed, separation by suction filtration and drying were performed, followed by calcination at 450° C. for 3 hours to obtain a precursor;

(4) 2.21 grams of hexaammonium molybdate and 0.00506 grams of potassium nitrate were dissolved in 40 ml of pure water; then, the precursor obtained in the preceding step was dispersed in the mixed solution; after dispersing under stirring for 4 hours, drying was performed at 110° C. for 6 hours;

(5) after drying, the solid was calcined at 450° C. for 5 hours to obtain a supported composite oxide catalyst.

The molar ratio of the catalyst components Fe:Mo:Si:K was 1:2.5:40:0.01. The specific surface area of the catalyst measured by nitrogen adsorption/desorption was 485 m²/g.

The activity of the catalyst was tested in the same manner as in Example 1. The test results are as follows:

| | Reaction Temperature, ° C. | | | | | |
| --- | --- | --- | --- | --- | --- | --- |
| | 200 | 210 | 220 | 230 | 240 | 250 |
| Methanol Conversion | 25.3% | 44.1% | 75.8% | 90.3% | 98.0% | 98.9% |
| Formaldehyde Selectivity | 96.9% | 96.9% | 96.1% | 96.6% | 96.1% | 95.9% |

After continuous operation at 240° C. for 100 hours, the methanol conversion dropped to 98.3%, and according to the ICP test results, the loss of molybdenum was 1.3%. The activity and stability of the catalyst were both relatively good.

Example 5

The method for preparing the catalyst is similar to that in Example 1, except that potassium nitrate was replaced with sodium nitrate. Particularly, the catalyst was prepared according to the following steps:

(1) 8.33 grams of surfactant P123 was dissolved in 250 grams of water at 40° C.; 83.33 grams of concentrated hydrochloric acid was added after the surfactant was completely dissolved; then, 2.02 grams of ferric nitrate and 0.96 grams of citric acid were added; 41.67 grams of tetraethyl orthosilicate was added slowly under stirring after ferric nitrate and citric acid were completely dissolved; hydrolysis was performed at 60° C. for 2 hours after the addition of tetraethyl orthosilicate was completed;

(2) then, the solution obtained after the hydrolysis was completed was transferred to a crystallization kettle lined with polytetrafluoroethylene to allow for crystallization at 100° C. for 24 hours;

(3) after the crystallization was completed, separation by suction filtration and drying were performed, followed by calcination at 450° C. for 3 hours to obtain a precursor;

(4) 2.21 grams of hexaammonium molybdate and 0.00425 grams of sodium nitrate were dissolved in 40 ml of pure water; then, the precursor obtained in the preceding step was dispersed in the mixed solution; after dispersing under stirring for 4 hours, drying was performed at 110° C. for 6 hours;

(5) after drying, the solid was calcined at 450° C. for 5 hours to obtain a supported composite oxide catalyst.

The molar ratio of the catalyst components Fe:Mo:Si:Na was 1:2.5:40:0.01. The specific surface area of the catalyst measured by nitrogen adsorption/desorption was 523 m²/g.

The activity of the catalyst was tested in the same manner as in Example 1. The test results are as follows:

| | Reaction Temperature, ° C. | | | | | |
| --- | --- | --- | --- | --- | --- | --- |
| | 200 | 210 | 220 | 230 | 240 | 250 |
| Methanol Conversion | 42.4% | 62.1% | 88.8% | 93.3% | 98.5% | 98.9% |
| Formaldehyde Selectivity | 95.8% | 95.9% | 95.4% | 95.6% | 95.1% | 95.4% |

After continuous operation at 240° C. for 100 hours, the methanol conversion dropped from 98.8% to 98.5% (a very small drop), and according to the ICP test results, the loss of molybdenum was 0.8%. The activity and stability of the catalyst were both relatively good.

Comparative Example 3

A catalyst was prepared according to the following steps:

(1) 8.33 grams of surfactant P123 was dissolved in 250 grams of water at 40° C.; 83.33 grams of concentrated hydrochloric acid was added after the surfactant was completely dissolved; then, 2.02 grams of ferric nitrate and 0.96 grams of citric acid were added; 41.67 grams of tetraethyl orthosilicate was added slowly under stirring after ferric nitrate and citric acid were completely dissolved; hydrolysis was performed at 60° C. for 2 hours after the addition of tetraethyl orthosilicate was completed;

(2) then, the solution obtained after the hydrolysis was completed was transferred to a crystallization kettle lined with polytetrafluoroethylene to allow for crystallization at 100° C. for 24 hours;

(3) after the crystallization was completed, separation by suction filtration and drying were performed, followed by calcination at 450° C. for 3 hours to obtain a supported catalyst.

The molar ratio of the catalyst components Fe:Mo was 1:40. The specific surface area of the catalyst measured by nitrogen adsorption/desorption was 758 m²/g.

The activity of the catalyst was tested in the same manner as in Example 1. The test results are as follows:

| | Reaction Temperature, ° C. | | | |
|---|---|---|---|---|
| | 200 | 210 | 220 | 230 |
| Methanol Conversion | 88.9% | 95.2% | 99.2% | 100% |
| Formaldehyde Selectivity | 35.8% | 44.3% | 42.1% | 33.3% |

As it can be seen from the above test results, the selectivity of the catalyst prepared by this method was very poor.

Comparative Example 4

A catalyst was prepared according to the following steps:
(1) 8.33 grams of surfactant P123 was dissolved in 250 grams of water at 40° C.; 83.33 grams of concentrated hydrochloric acid was added after the surfactant was completely dissolved; then, 2.02 grams of ferric nitrate and 0.96 grams of citric acid were added; 41.67 grams of tetraethyl orthosilicate was added slowly under stirring after ferric nitrate and citric acid were completely dissolved; hydrolysis was performed at 60° C. for 2 hours after the addition of tetraethyl orthosilicate was completed;
(2) then, the solution obtained after the hydrolysis was completed was transferred to a crystallization kettle lined with polytetrafluoroethylene to allow for crystallization at 100° C. for 24 hours;
(3) after the crystallization was completed, separation by suction filtration and drying were performed, followed by calcination at 450° C. for 3 hours to obtain a precursor;
(4) 2.21 grams of hexaammonium molybdate was dissolved in 40 ml of pure water; then, the precursor obtained in the preceding step was dispersed in the mixed solution; after dispersing under stirring for 4 hours, drying was performed at 110° C. for 6 hours;
(5) after drying, the solid was calcined at 450° C. for 5 hours to obtain a supported composite oxide catalyst.

The molar ratio of the catalyst components Fe:Mo:Si was 1:2.5:40. The specific surface area of the catalyst measured by nitrogen adsorption/desorption was 538 m$^2$/g.

The activity of the catalyst was tested in the same manner as in Example 1. The test results are as follows:

| | Reaction Temperature, ° C. | | | | | |
|---|---|---|---|---|---|---|
| | 200 | 210 | 220 | 230 | 240 | 250 |
| Methanol Conversion | 54.1% | 72.1% | 90.1% | 96.53% | 99.0% | 99.5% |
| Formaldehyde Selectivity | 94.8% | 93.9% | 94.4% | 94.8% | 94.1% | 93.3% |

After continuous operation at 240° C. for 100 hours, the methanol conversion dropped from 99.0% to 98.0%, and the selectivity of the catalyst was relatively low. According to the ICP test results, the loss of molybdenum was 2.3%.

Comparative Example 5

Use was made of a process in which iron and molybdenum were added simultaneously during synthesis of a molecular sieve instead of subsequent impregnation of molybdenum.

A catalyst was prepared according to the following steps:
(1) firstly, 4.17 grams of surfactant P123 was dissolved in 125 grams of water at 40° C.; 25 grams of concentrated hydrochloric acid was added after the surfactant was completely dissolved; then, 4.04 grams of ferric nitrate, 7.06 grams of hexaammonium molybdate, 0.0101 grams of potassium nitrate and 1.92 grams of citric acid were added; 41.67 grams of tetraethyl orthosilicate was added slowly under stirring after ferric nitrate, hexaammonium molybdate, potassium nitrate and citric acid were completely dissolved; hydrolysis was performed at 60° C. for 2 hours after the addition of tetraethyl orthosilicate was completed;
(2) then, the solution obtained after the hydrolysis was completed was transferred to a crystallization kettle lined with polytetrafluoroethylene to allow for crystallization at 110° C. for 24 hours;
(3) after the crystallization was completed, separation by suction filtration and drying were performed, followed by calcination at 500° C. to obtain a supported composite oxide catalyst.

The molar ratio of the catalyst components Fe:Mo:Si:K was 1:4:20:0.01. The specific surface area of the catalyst measured by nitrogen adsorption/desorption was 402 m$^2$/g.

The activity of the catalyst was tested in the same manner as in Example 1. The test results are as follows:

| | Reaction Temperature, ° C. | | | | | |
|---|---|---|---|---|---|---|
| | 200 | 210 | 220 | 230 | 240 | 250 |
| Methanol Conversion | 43.5% | 72.3% | 90.5% | 96.3% | 98.7% | 99.2% |
| Formaldehyde Selectivity | 93.2% | 92.5% | 92.3% | 90.4% | 88.3% | 83.5% |

What is claimed is:

1. A supported composite oxide catalyst, wherein the catalyst has a general formula of $$FeMo_aSi_bX_cO_d$$

wherein X is a modifying metal selected from alkali metals or alkaline earth metals;

wherein a=0.5-5, b=10-50, c=0.001-0.1, d represents an amount of oxygen element balancing chemical valence;

wherein the supported composite oxide catalyst has a pore diameter of 6-10 nm;

wherein the catalyst is prepared according to the following method:

(i) providing an acidic aqueous solution of a surfactant;

(ii) dissolving an iron-containing compound and a complexing agent in the acidic aqueous solution, adding tetra-C$_{1-4}$ alkyl orthosilicate, followed by hydrolysis, crystallization and calcination to obtain a precursor;

(iii) formulating the precursor, a molybdenum-containing compound and a modifying metal compound into a mixed solution, followed by drying and calcination to obtain the supported composite oxide catalyst.

2. The catalyst of claim 1, wherein a=0.8-4.6;

b=13-46;

c=0.005-0.096;

wherein the supported composite oxide catalyst has a pore diameter of 7-10 nm.

3. The catalyst of claim 1, wherein the catalyst is selected from $FeMo_4Si_{20}K_{0.01}O_d$, $FeMo_{2.5}Si_{40}K_{0.01}O_d$, $FeMo_4Si_{20}Na_{0.01}O_d$, $FeMo_4Si_{20}K_{0.01}O_d$, or a mixture thereof.

4. The catalyst of claim 1, wherein in the acidic aqueous solution of the surfactant, a mass ratio of hydrogen ions to the surfactant is 0.05-0.15:1;

wherein the surfactant is selected from polyoxyethylene ether-polyoxypropylene ether-polyoxyethylene ether, poly(1,2-ethylene glycol)-polypropylene glycol-poly (1,2-ethylene glycol), polyethylene oxide-polypropylene oxide-polyethylene oxide triblock copolymers or a combination of two or more thereof.

5. The catalyst of claim 1, wherein the complexing agent is selected from citric acid and/or tartaric acid; and a molar ratio of the complexing agent to the iron-containing compound is 0.2-3:1.

6. The catalyst of claim 1, wherein
a=2.1-3.1;
b=25-35;
c=0.02-0.08;
wherein the supported composite oxide catalyst has a pore diameter of 8-9 nm.

7. The catalyst of claim 1, wherein in the acidic aqueous solution of the surfactant, a mass ratio of hydrogen ions to the surfactant is 0.09-0.11:1;

wherein the surfactant is selected from polyoxyethylene ether-polyoxypropylene ether-polyoxyethylene ether, poly(1,2-ethylene glycol)-polypropylene glycol-poly (1,2-ethylene glycol), polyethylene oxide-polypropylene oxide-polyethylene oxide triblock copolymers or a combination of two or more thereof.

8. The catalyst of claim 1, wherein the complexing agent is selected from citric acid and/or tartaric acid; and a molar ratio of the complexing agent to the iron-containing compound is 1.5-1.6:1.

9. A method for preparing a supported composite oxide catalyst, wherein the catalyst has a general formula of $$FeMo_aSi_bX_cO_d$$

wherein X is a modifying metal selected from alkali metals or alkaline earth metals;

wherein a=0.5-5, b=10-50, c=0.001-0.1, d represents an amount of oxygen element balancing chemical valence;

wherein the supported composite oxide catalyst has a pore diameter of 6-10 nm;

wherein the method comprises:

(i) providing an acidic aqueous solution of a surfactant;

(ii) dissolving an iron-containing compound and a complexing agent in the acidic aqueous solution, adding tetra-$C_{1-4}$ alkyl orthosilicate, followed by hydrolysis, crystallization and calcination to obtain a precursor;

(iii) formulating the precursor, a molybdenum-containing compound and a modifying metal compound into a mixed solution, followed by drying and calcination to obtain the supported composite oxide catalyst.

10. The method of claim 9, wherein
a=0.8-4.6;
b=13-46;
c=0.005-0.096;
wherein the catalyst is selected from $FeMo_4Si_{20}K_{0.01}O_d$, $FeMo_{2.5}Si_{40}K_{0.01}O_d$, $FeMo_4Si_{20}Na_{0.01}O_d$, $FeMo_4Si_{20}K_{0.01}O_d$, or a mixture thereof;
wherein the supported composite oxide catalyst has a pore diameter of 7-10 nm.

11. The method of claim 9, wherein in the acidic aqueous solution of the surfactant, a mass ratio of hydrogen ions to the surfactant is 0.05-0.15:1;

wherein the surfactant is selected from polyoxyethylene ether-polyoxypropylene ether-polyoxyethylene ether, poly(1,2-ethylene glycol)-polypropylene glycol-poly (1,2-ethylene glycol), polyethylene oxide-polypropylene oxide-polyethylene oxide triblock copolymers or a combination of two or more thereof.

12. The method of claim 9, wherein the complexing agent is selected from citric acid and/or tartaric acid; and a molar ratio of the complexing agent to the iron-containing compound is 0.2-3:1.

13. The method of claim 9, wherein the iron-containing compound is selected from ferric nitrate, ferrous nitrate, ferric sulfate, ferrous sulfate, ferric chloride, ferrous chloride, or a combination thereof;

wherein the molybdenum-containing compound is selected from ammonium metamolybdate, ammonium molybdate, sodium molybdate, lithium molybdate, potassium molybdate or a combination of two or more thereof;

wherein the $C_{1-4}$ alkyl orthosilicate is selected from tetramethyl orthosilicate, tetraethyl orthosilicate, tetrapropyl orthosilicate, tetrabutyl orthosilicate, methyl triethyl orthosilicate, dimethyl diethyl orthosilicate or a mixture of two or more thereof.

14. The method of claim 9, wherein
a=2.1-3.1;
b=25-35;
c=0.02-0.08;
wherein the catalyst is selected from $FeMo_4Si_{20}K_{0.01}O_d$, $FeMo_{2.5}Si_{40}K_{0.01}O_d$, $FeMo_4Si_{20}Na_{0.01}O_d$, $FeMo_4Si_{20}K_{0.01}O_d$, or a mixture thereof;
wherein the supported composite oxide catalyst has a pore diameter of 8-9 nm.

15. The method of claim 9, wherein in the acidic aqueous solution of the surfactant, a mass ratio of hydrogen ions to the surfactant is 0.09-0.11:1;

wherein the surfactant is selected from polyoxyethylene ether-polyoxypropylene ether-polyoxyethylene ether, poly(1,2-ethylene glycol)-polypropylene glycol-poly (1,2-ethylene glycol), polyethylene oxide-polypropylene oxide-polyethylene oxide triblock copolymers or a combination of two or more thereof.

16. The method of claim 9, wherein the complexing agent is selected from citric acid and/or tartaric acid; and a molar ratio of the complexing agent to the iron-containing compound is 1.5-1.6:1.

* * * * *